United States Patent
Wu et al.

(10) Patent No.: US 10,423,827 B1
(45) Date of Patent: Sep. 24, 2019

(54) IMAGE TEXT RECOGNITION

(71) Applicant: Amazon Technologies, Inc., Seattle, WA (US)

(72) Inventors: Jonathan Wu, Seattle, WA (US); Meng Wang, Seattle, WA (US); Wei Xia, Seattle, WA (US); Ranju Das, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 15/641,774

(22) Filed: Jul. 5, 2017

(51) Int. Cl.
*G06K 9/00* (2006.01)
*G06T 7/11* (2017.01)
*G06K 9/66* (2006.01)

(52) U.S. Cl.
CPC ..... *G06K 9/00456* (2013.01); *G06K 9/00463* (2013.01); *G06K 9/66* (2013.01); *G06T 7/11* (2017.01)

(58) Field of Classification Search
CPC ......... G06T 7/0081; G06T 2207/20144; G06T 7/0083; G06T 2207/10016; G06T 2207/30176; G03B 15/02; G03B 15/05; G03B 15/06; G03B 15/03; F21W 2131/406; G06K 9/38; G06K 9/00456; G06K 9/00463; H04N 1/40062
See application file for complete search history.

(56) References Cited

U.S. PATENT DOCUMENTS

| | | | |
|---|---|---|---|
| 6,385,350 B1 * | 5/2002 | Nicholson | G06K 9/00442 382/190 |
| 2014/0257943 A1 * | 9/2014 | Nerayoff | G06T 7/292 705/13 |

* cited by examiner

*Primary Examiner* — Duy M Dang
(74) *Attorney, Agent, or Firm* — Lowenstein Sandler LLP (57) ABSTRACT

A method and system for analyzing text in an image. Classification and localization information is identified for the image at a word and character level. A detailed profile is generated that includes attributes of the words and characters identified in the image. One or more objects representing a predicted source of the text are identified in the image. In one embodiment, neural networks are employed to determine localization information and classification information associated with the identified object of interest (e.g., a text string, a character, or a text source).

19 Claims, 6 Drawing Sheets

IMAGE TEXT RECOGNITION

BACKGROUND

Image analysis services are used to analyze an image of a scene and determine if one or more objects are present in the image. Frequently, images include text that is difficult to detect due to the positioning of the text and a lack of context associated with the words or characters of the text.

In many applications (e.g., military, law enforcement, and security applications), detailed information concerning text-based regions of an image is desired. However, due to a lack of granularity in the detection phase, certain image processing systems are limited in the level of information that can be provided regarding portions of an image that include text. Accordingly, conventional image processing systems ineffectively process text-based regions of images and produce a robust set of attributes corresponding to the text within a scene captured by the image.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to recognizing a text string within an image using an image text recognition system including deep neural networks configured to classify and localize the text string at a line, word, and character level. A deep neural network is an artificial neural network with multiple hidden layers of units between an input layer and an output layer. In one embodiment, the image text recognition system includes multiple region proposal and classification neural networks. In one embodiment, the neural networks determine classification information associated with an identified object of interest (e.g., a text string, a character, or a text source) to enable a classification of the object. In one embodiment, a text source refers to an object representing a predicted source of a text string identified within an image. Example text sources include, but are not limited to, a license plate, a road sign, a transaction receipt, an envelope, a business card, etc.)

In one embodiment, localization is performed by the respective neural networks of the image text recognition system to identify region proposals within the image. In one embodiment, a region proposal includes a portion of an image that the image text recognition system predicts includes a text-based object. In one embodiment, localization is performed to identify a position or location of the region proposal within the image. In one embodiment, the neural networks identify one or more region proposals including an object of interest, such as a text string (e.g., a word), character, or text source information).

In one embodiment, the image text recognition system performs classification of the one or more detected objects. For example, a classification or text type may be identified for the contents of a text string (e.g., one or more words or text string configurations). Example classifications may include a license plate number, an address, a phone number, a zip code, a monetary value, etc.)

In one embodiment, the neural networks of the image text recognition system optimize the localization and the classification associated with an image. In one embodiment, a joint loss function is employed to optimize both the localization (e.g., bounding box regression) of a region proposal and classification corresponding to a detected object (e.g., text string, character, or text source) in a substantially simultaneous manner.

In one embodiment, a first neural network, or text string detector, of the image text recognition system receives an image and detects and localizes one or more text strings. In one embodiment, the text string detector, detects and localizes (e.g., identifies a first region of interest predicted to include one or more words) and classifies one or more words within the image.

In one embodiment, a second neural network, or character detector, of the image text recognition system is applied to the first region of interest (e.g., as identified by the text string detector) to detect and localize one or more characters of the identified text string. For example, the character detector detects, localizes, and classifies the one or more characters (e.g., letters, numbers, symbols, punctuation, etc.) of a text string, such as a word.

In one embodiment, a third neural network, or text source detector, of the image text recognition system receives an image and detects and localizes one or more objects within the image that represent predicted sources of text (e.g., text sources). Example text sources include, but are not limited to, a license plate, road sign, receipt, envelope, etc. In one embodiment, the text source may be presented by an object within the image that identifies a potential "source" or context of the text.

In one embodiment, localization performed by the respective neural networks results in an oriented quadrilateral (e.g., a multi-sided polygon with coordinate information) identifying a position or location within the image of a proposed region of interest (e.g., a region including an object such as a text string, a character, or information identifying a text source). In one embodiment, the localization information includes coordinates provided in a clockwise order to enable the orientation of proposed region to be determined.

Figure 1:
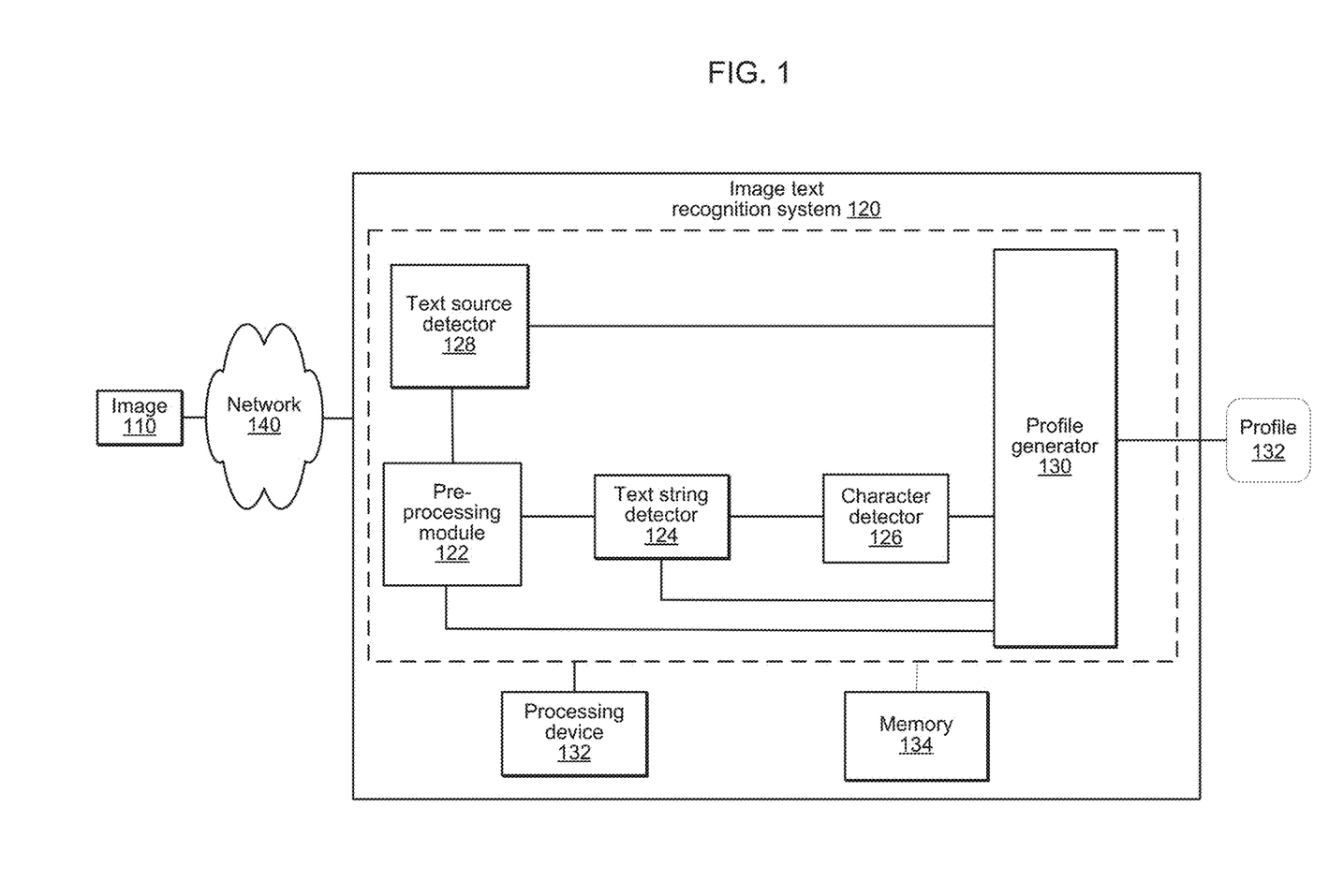
FIG. 1 illustrates an example image text recognition system, according to one embodiment.

FIG. 1 is a block diagram illustrating various components of an image text recognition system 120, according to one embodiment. In one embodiment, the image text recognition system 120 may include multiple neural networks trained to detect one or more objects in an image 110. In one embodiment, example neural networks may include, but are not limited to, region proposal and classification deep neural networks, convolutional neural networks, region-based convolutional neural networks, deep neural networks, etc., or a combination thereof.

In one embodiment, the image text recognition system 120 may be an online service configured to analyze Unicode text in the image. In one embodiment, the image 110 may be received by the image text recognition system 120 via a suitable network 140, including, for example, the Internet, intranets, extranets, wide area networks (WANs), local area networks (LANs), wired networks, wireless networks, or other suitable networks, etc., or any combination of two or more such networks.

In one embodiment, the image text recognition system 120 classifies and localizes (including coordinate information and orientation information) text at a line, text string (e.g., word), and character level for the image 110. In one embodiment, the image text recognition system 120 includes a text string detector 124 including a neural network trained to detect, localize, and classify one or more text strings (e.g., words) within the image 110. In one embodiment, the image text recognition system 120 includes a character detector 126 including a neural network trained to detect, localize, and classify one or more characters of the one or more identified text strings. In one embodiment, the image text recognition system 120 includes a text source detector 128 including a neural network trained to detect, localize, and classify one or more text sources corresponding to the one or more identified text strings.

In one embodiment, the image text recognition system 120 includes a pre-processing module 122. The pre-processing module 122 receives the image 110 and generates multiple resolutions of the image 110. In one embodiment, the pre-processing module 122 resizes the image 110 to an optimal size and pads the re-sized image for passing to a neural network of the text string detector 124 for inference processing. In one embodiment, the multiple resolution versions of the image 110 are provided by the pre-processing module 122 to the text source detector 128 and the text string detector 124 to enable the production of predicted regions of interest (e.g., estimated bounding box coordinates) across multiple image resolution scales that may be combined for a more robust localization estimate by the text string detector 124, the character detector 126, and the text source detector.

In one embodiment, the text string detector 124 may be trained to detect one or more text strings in the image 110. In one embodiment, the text string detector 124 is trained using a collection of curated scene and document image datasets, also referred to as "training datasets". In one embodiment, the training datasets may be annotated with quadrilateral annotations representing bounding box regions including one or more text strings (e.g., words). In one embodiment, the training dataset includes synthetic data and real image data including text collected from one or networks. In one embodiment, the synthetic data of the training dataset may be annotated with the quadrilateral markings during creation of the synthetic data. In one embodiment, the real image data may be annotated via a user-input process, such as a crowdsourcing mechanism (e.g., Amazon® MTurk).

In one embodiment, the training dataset uses a scene text generator to generate synthetic text in an image under multiple photorealistic distortions. In one embodiment, the image text generator (not shown in FIG. 1) processes images at a text string (e.g., word) localization level. For example, for text string localization, multiple "words" or text strings (e.g., thousands of text strings, such as "%1rd29", "house" johndoe@email.com, "144-41-009312") are placed in an image. In one embodiment, the image text generator is configured to vary various attributes of the image and text strings, such as, for example, font color, font size, background image, rotation (e.g., perspective transformations), text width, text height, padding (e.g., new lines, indents). In one embodiment, the image text generator adds data augmentation "noise" filters, such as, for example, static blurring, contour embossing, smoothing, sharpening, motion blurring, random levels of compression (e.g., JPEG compression), etc.

In one embodiment, the image text generator (not shown in FIG. 1) processes images at a character localization level. In one embodiment, a set of one or more characters (e.g., 1-30 characters) are placed in an image in structured and unstructured formats, such as, for example, a "free form" format, a "license plate" format, a "phone number' format, etc. In one embodiment, the image text generator is configured to vary various attributes of the image and characters, such as, for example, font color, font size, background image, rotation (e.g., perspective transformations), text width, text height, padding (e.g., new lines, indents), a language of the characters, etc. In one embodiment, the image text generator adds data augmentation "noise" filters, such as, for example, character borders, strikethroughs, static blurring, contour embossing, smoothing, sharpening, motion blurring, random levels of compression (e.g., JPEG compression), etc.

In one embodiment, the text string detector 124 receives as an input the image 110 as processed by the pre-processing module 122, and identifies one or more regions of interest (region proposals) within the image 110 representing a predicted location of a text string (also referred to as a "text string prediction region"). In one embodiment, the text string detector 124 is configured to use default bounding boxes and aspect ratios that are customizable to support the natural elongation of text strings. In one embodiment, the text string detector 124 identifies the regions of interest corresponding to a text string and provides the information associated with the regions of interest to the character detector 126 for character annotation (e.g., letters, numbers, symbols, etc.). In one embodiment, the text string detector 124 provides the one or more identified text string prediction regions to the character detector 126 and the profile generator 130.

In one embodiment, the character detector 126 receives as an input the one or more text string prediction regions (e.g., a region within the image predicted to have a text string or word as received from the text string detector 124) and predicts a location or region of the image 110 of one or more characters of the one or more text strings (also referred to as "character prediction regions"). In one embodiment, the character detector 126 is configured to use default bounding boxes and aspect ratios that are customizable to support the identification of atypical character shapes and sizes (e.g., square-shaped characters). In one embodiment, the character detector 128 may be executed multiple times corresponding to each of the predicted text string regions identified by the text string detector 124. In one embodiment, the character detector 128 provides the one or more character prediction regions to the profiler generator 130.

In one embodiment, the text source generator 128 receives image 110 as in input and outputs one or more regions in the image 110 where one or more text-related image sources are found (also referred to as one or more "text source regions"). Example text-related image sources, or text sources, include a street sign, a license plate, a receipt, etc. In one embodiment, the one or more text source regions are provided to the profile generator 130 for use in determining attributes corresponding to the text source, as described in greater detail below.

In one embodiment, the profile generator 130 receives information from the pre-processing module 122, the text string detector 124, the character detector 126 and the text source generator 128 and generates a profile 132 including text information and attributes relating to the text identified in the image 110. In one embodiment, the profile generator 130 receives: a set of multiple resolutions of the image 110 from the pre-processing module; one or more text string prediction regions from the text string detector 124; and one or more character prediction regions from the character detector 126. In one embodiment, the profile generator 130 aggregates the aforementioned outputs to generate the profile 132 including text information including a language of the text and an identification of the text at a line, text string (e.g., word), and character level. In one embodiment, the profile generator 132 determines text attributes corresponding to the identified text. Example text attributes include, but are not limited to, font size, font type, the text source (e.g., a license plate, road sign, billboard, receipt, freeform, etc.), a language of the text (characters and words), orientation information associated with the text, etc. In one embodiment, the profile generator 132 determines a classification or text type corresponding to the identified text. Example classifications include, but are not limited to, a license plate number, an address, a phone number, a zip code, monetary value, etc.)

In one embodiment, the profile generator 130 includes a knowledge-graph defining associations between a text source and a classification. For example, the knowledge-graph may include an association between a license plate (text source) and license plate number (classification), defining a relationship indicating that license plate numbers are located within license plates. In one embodiment, the multiple associations may be used to filter and identify the text attributes based on the identified text source. In one embodiment, the profile 132 may be any suitable file format, such as, for example, a JavaScript Object Notation (JSON) file. In one embodiment, the profile 132 may be provided by the profile generator 130 to a computing system (e.g., a computing system that submitted the image 110 to the image text recognition system 120 for analysis), stored in a data store (e.g., memory 134), or a combination thereof.

In one embodiment, the image text recognition system 120 includes a processing device 138 and a memory 134 configured to execute and store instructions associated with the functionality of the various components, services, and modules of the image text recognition system 120, as described in greater detail below in connection with FIGS. 2-6.

Figure 2:
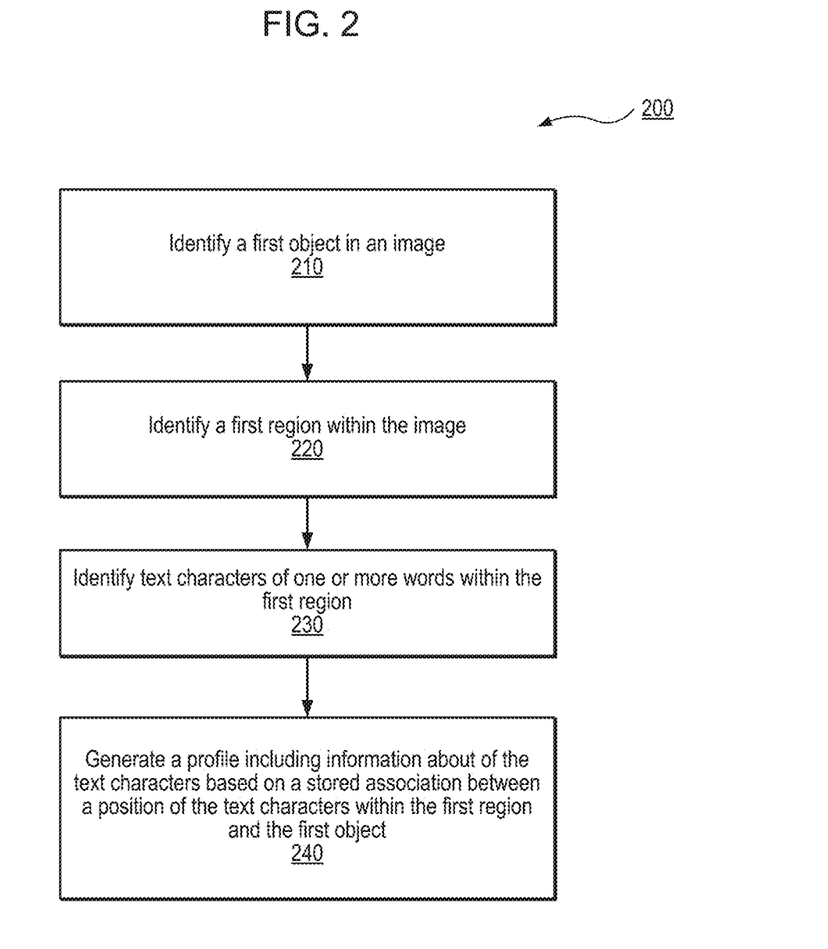
FIG. 2. depicts a flow diagram illustrating processing by an image text recognition system, according to one embodiment.

FIG. 2 illustrates a flowchart that provides an example of a process 200 executed by an image text recognition system 120 of FIG. 1), according to various embodiments. It is understood that the flowchart of FIG. 2 provides an example of the many different types of functional arrangements that may be employed to implement the operation of the image text recognition system 120 as described herein. Process 200 may be performed by a processing logic that may comprise hardware (e.g., circuitry, dedicated logic, programmable logic, microcode, etc.), software (e.g., instructions run on a processing device), or a combination thereof.

In block 210, an object is identified in an image. In one embodiment, the object is detected by a text source detector (e.g., text source detector 128 of FIG. 1) including a neural network configured to detect one or more objects in an image. In one embodiment, the one or more objects represent a predicted source of text within the image. For example, for an image of a scene including a street with multiple vehicles, objects including a road sign of the vehicles may be identified in block 210.

In block 220, a first region within the image is identified. In one embodiment, the first region is a text string prediction region wherein one or more text strings are identified. For example, the first region may be a portion of the image including a text string or word of a road sign (e.g., the text string "STOP"). In one embodiment, the first region may be identified by a text string detector (e.g., the text string detector 124 of FIG. 1) including a neural network trained to detect text strings (e.g., words or other text groupings). In one embodiment, the text string detector may receive multiple versions of the image having different resolutions from a pre-processing stage (e.g., processing performed by the pre-processing module 122 of FIG. 1). In one embodiment, bounding box coordinates of the first region are identified in block 220. In one embodiment, the first region is represented by an oriented quadrilateral (e.g. a four-sided polygon) with coordinates arranged in a clockwise order to enable the orientation of the first region to be determined. In one embodiment, the orientation information may be included in a profile associated with the image.

In block 230, one or more text characters of one or more text strings (e.g., words) within the first region are identified. In one embodiment, the one or more characters may include numbers, letters, symbols, etc. that are included within the one or more text strings identified within the first region. In one embodiment, detection and localization corresponding to the one or more characters is performed by a neural network (e.g., character detector 126 of FIG. 1) trained to detect and localize characters. In one embodiment, a text string candidate region (e.g., the first region) is provided by a text string generator to a character generator configured to detect and localize the one or more characters within the text string candidate region. In one embodiment, one or more character prediction regions are generated in block 230. In one embodiment, the one or more text characters within the first region are localized and classified by a neural network of a character detector (e.g., character detector 126 of FIG. 1).

In block 240, a profile is generated that includes information corresponding to the text characters based on a stored association of a position of the text characters within the first region and the first object. In one embodiment, an association between the first object (e.g., a predicted text source) and a classification of the characters is used to determine information about the text characters including attributes such as font size, font type, a language of the text characters or words, and an orientation of the text characters or words. For example, a stored association between a road sign (e.g., the first object or text source) and the location of the identified characters within a first region of the road sign may result in the classification of the text string "STOP" and the characters "S", "T", "O", and "P" along with a font type (e.g., highway gothic font of a sans-serif typeface set used in road signage) and font size (e.g., 250 mm character font height). In one embodiment, the profile may be a detailed JSON file including information corresponding to the image, the text (e.g., a language of the text, one or more words, one or more characters, etc.) and text attributes (e.g., font size, font type, text source, etc.).

Figure 3:
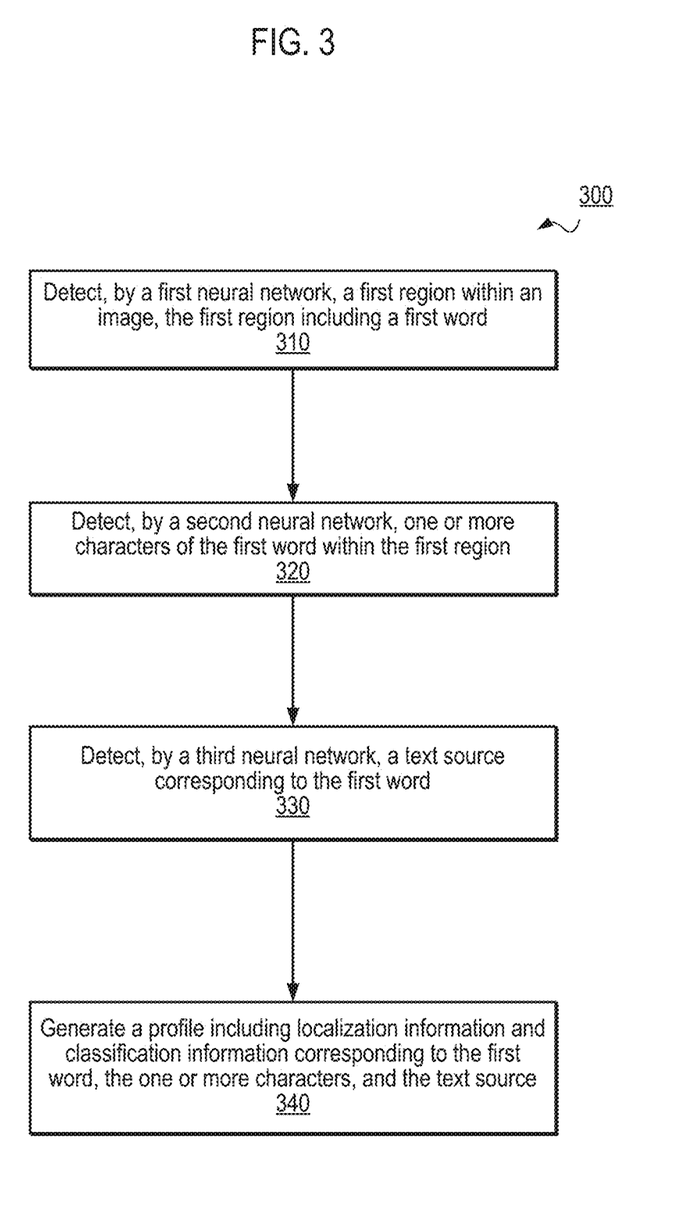
FIG. 3 depicts a flow diagram illustrating processing by an image text recognition system, according to one embodiment.

FIG. 3 illustrates a flowchart that provides an example of a process 300 executed by a neural network (e.g., image text recognition system 120 of FIG. 1), according to various embodiments. It is understood that the flowchart of FIG. 3 provides an example of the many different types of functional arrangements that may be employed to implement the operation of the image text recognition system 120 as described herein. Process 300 may be performed by a processing logic that may comprise hardware (e.g., circuitry, dedicated logic, programmable logic, microcode, etc.), software (e.g., instructions run on a processing device), or a combination thereof.

In block 310, a first region within an image is detected by a first neural network of an image text recognition system. In one embodiment, the first region includes a first word (e.g., a recognized grouping or text string). In one embodiment, the first region, also referred to as a text string candidate region, is generated by a region proposal and classification deep neural network trained to detect, localize, and classify words within an image. In one embodiment, the neural network is configured to optimize the localization and classification substantially simultaneously. For example, the neural network may employ a weighted multi-loss function for optimization of a smooth least absolute deviations (L1) loss for localizing (e.g., performing bounding box regression) a quadrilateral corresponding to the first region and a soft-max loss for classification of the object (e.g., the first word). In one embodiment, a joint loss function is optimized, as represented by the following example equation:

$$L_{all} = L_{smoothL1} + \alpha L_{softmax};$$

wherein classification and localization (e.g., bounding box regression) are optimized substantially simultaneously. Alternative joint loss functions and corresponding equations may be employed to optimize the localization and classification information substantially simultaneously.

In block 320, one or more characters of the first word are detected by a second neural network. In one embodiment, one or more regions corresponding to predicted characters of the first word (e.g., character prediction regions) are identified. In one embodiment, a neural network trained to detect one or more characters analyzes the first region (as received from the neural network trained for word detection) and predicts a location (e.g., as represented by a bounding box) of characters of the first word. In one embodiment, a region proposal and classification deep neural network trained to detect, localize, and classify characters is applied to the first region. In one embodiment, the character detector neural network is configured to optimize the localization and classification of characters substantially simultaneously. As described above, the neural network may employ a weighted multi-loss function for optimization of a smooth L1 loss for localizing (e.g., performing bounding box regression) a quadrilateral corresponding to the first region and a soft-max loss for classification of the object (e.g., one or more characters).

In block 330, an object representing a predicted source of the first word (e.g., a text source) is detected. In one embodiment, a region is identified within the image that corresponds to a text source associated with the first word. For example, the text source may be a transaction receipt and the first word may be "Sale", "Amount", "$138.95", etc. In one embodiment, a region proposal and classification deep neural network (e.g., the text source generator in FIG. 1) trained to detect, localize, and classify one or more text sources is applied to the image. In one embodiment, the character detector neural network is configured to optimize the localization and classification of characters substantially simultaneously. As described above, the neural network may employ a weighted multi-loss function for optimization of a smooth L1 loss for localizing (e.g., performing bounding box regression) a quadrilateral corresponding to a text source candidate region and a soft-max loss for classification of the object (e.g., a text source).

In block 340, the outputs of the text string detector (e.g., the word prediction region and text string classification information), the character detector (e.g., the character prediction regions and character classification information), and the text source detector (e.g., the text source prediction region and text source classification information) are provided to a profile generator for the generation of a profile corresponding to the image. In one embodiment, the profile generator analyzes the aforementioned information and generates the profile including text information (e.g., localization and classification information corresponding to the first word, the one or more characters, a language) and text attributes (e.g., a font size, font type, text source). In one embodiment, the profile (e.g., a detailed file) may be provided to a computing system (e.g., a computing system associated with the submission of the image for analysis) and stored in a data store. In one embodiment, a knowledge graph of associations between the text source and classifications of the first word and characters may be used to determine and refine the text attributes. In one embodiment, any suitable configuration or format of the profile may be employed, including, for example, a JSON file.

Figure 4:
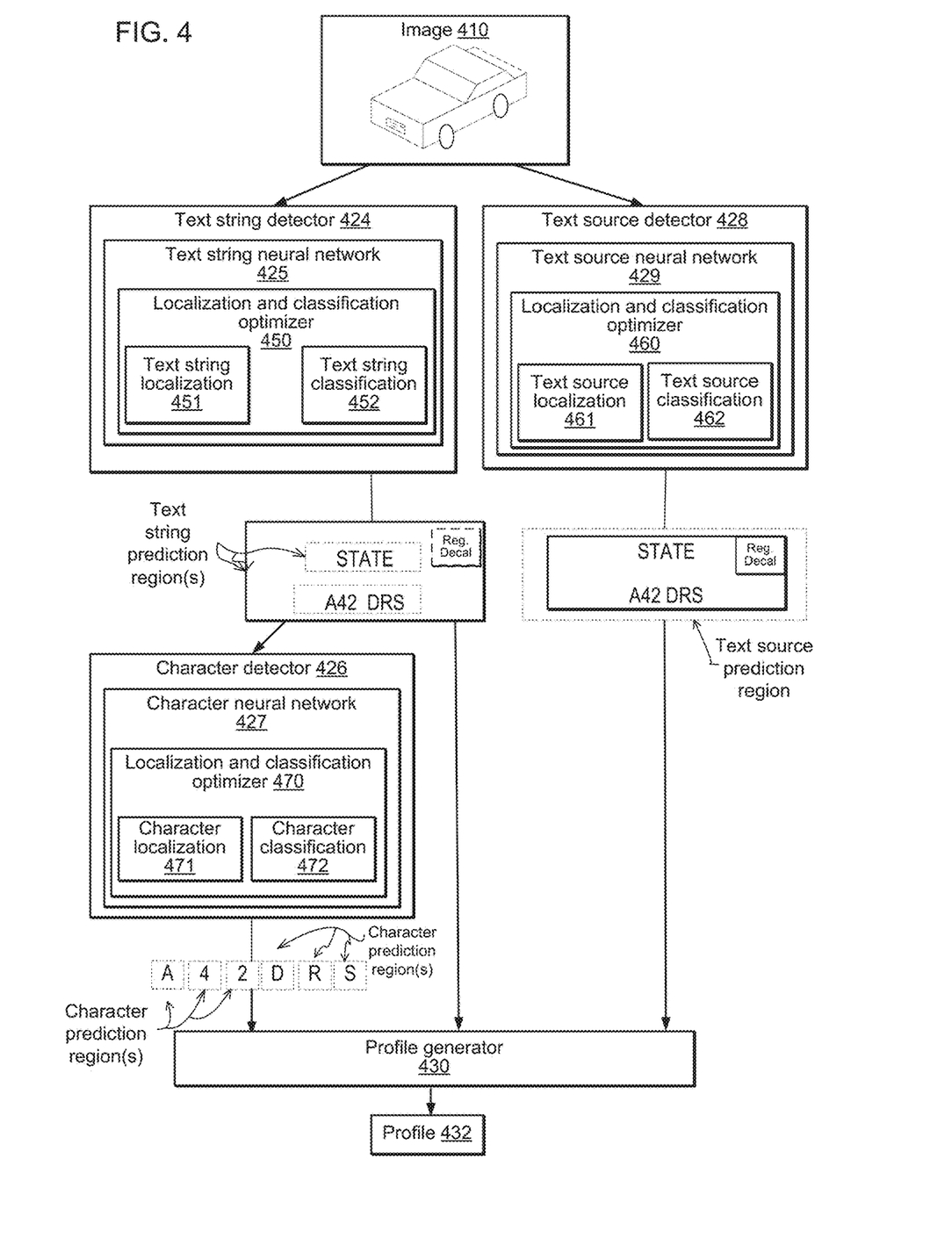
FIG. 4 illustrates an example image text recognition system, according to one embodiment.

FIG. 4 illustrates an example of aspects of an image text recognition system configured to process an image 410 to generate a corresponding profile 432. As illustrated, this example relates to the processing of an image 410 of a scene including a vehicle. In one embodiment, the image 410 is received by a text string detector 424 and a text source detector 428.

In one embodiment, the text string detector 424 includes a text string neural network trained to detect one or more text strings (e.g., words) within the image 410. In one embodiment, the text string detector 424 is configured to include a localization and classification optimizer 450. In one embodiment, the localization and classification optimizer 450 may include a set of instructions executable by a processing device to optimize text string localization 451 and text string classification 452 substantially simultaneously. As shown in the example in FIG. 4, the text string detector 424 may identify multiple text string prediction regions within the image 410, including a first text string prediction region corresponding to a text string "A42 DRS". In one embodiment, the results of the processing of the image 410 by the text string detector 424 (e.g., the one or more text string prediction regions, text string localization information, and text string classification information) are provided to a profile generator 430.

In one embodiment, the text source generator 428 performs analysis on the image 410 using a text source neural network 429 (e.g., a region proposal and classification deep neural network) trained to detect and localize one or more text sources. In one embodiment, the text source neural network 429 includes a localization and classification optimizer 460 programmed to optimize text source localization 461 and text source classification 462 substantially simultaneously. As shown in the example in FIG. 4, the text source detector 428 may identify multiple text source prediction regions within the image 410, including a first text source prediction region corresponding to a region of the image of the vehicle corresponding to the vehicle's license plate. In one embodiment, the results of the processing of the image 410 by the text source detector 428 (e.g., the one or more text source prediction regions, text source localization information, and text source classification information) are provided to the profile generator 430.

In one embodiment, as shown in FIG. 4, the one or more text string prediction regions are provided to a character detector 426. In one embodiment, the character detector 426 includes a character neural network 427 (e.g., a region proposal and classification deep neural network) trained to detect and localize one or more characters. In one embodiment, the text source neural network 429 includes a localization and classification optimizer 470 programmed to optimize character localization 471 and character classification 472 substantially simultaneously. As shown in the example in FIG. 4, the character detector 426 may identify multiple character prediction regions within the one or more text string prediction regions. In this example, the character detector 426 detects, localizes, and classifies characters corresponding to character prediction regions "A", "4", "2", "D", "R", and "S" of the text string candidate region "A42 DRS". In one embodiment, the results of the processing of the one or more text string prediction regions by the character detector 426 (e.g., the one or more character prediction regions, character localization information, and character classification information) are provided to the profile generator 430.

In one embodiment, the profile generator 430 analyzes the information received from the text string detector 424, text source detector 428, and character detector 426 to generate a profile 432 corresponding to the image 410. For example, the profile 432 may be a file (e.g., a JSON file) including information identifying the text string prediction regions, the text string localization 451, the text string classification 452, the text source prediction region(s), the text source localization 461, the text source classification 462, the character prediction regions, the character localization 471, and the character classification 472. In one embodiment, the profile generator 430 is a set of instructions executable by a processing device to determine text information at a line, word, and character level and text attributes (e.g., font size, font type, text source) corresponding to the text identified within the image 410.

Figure 5:
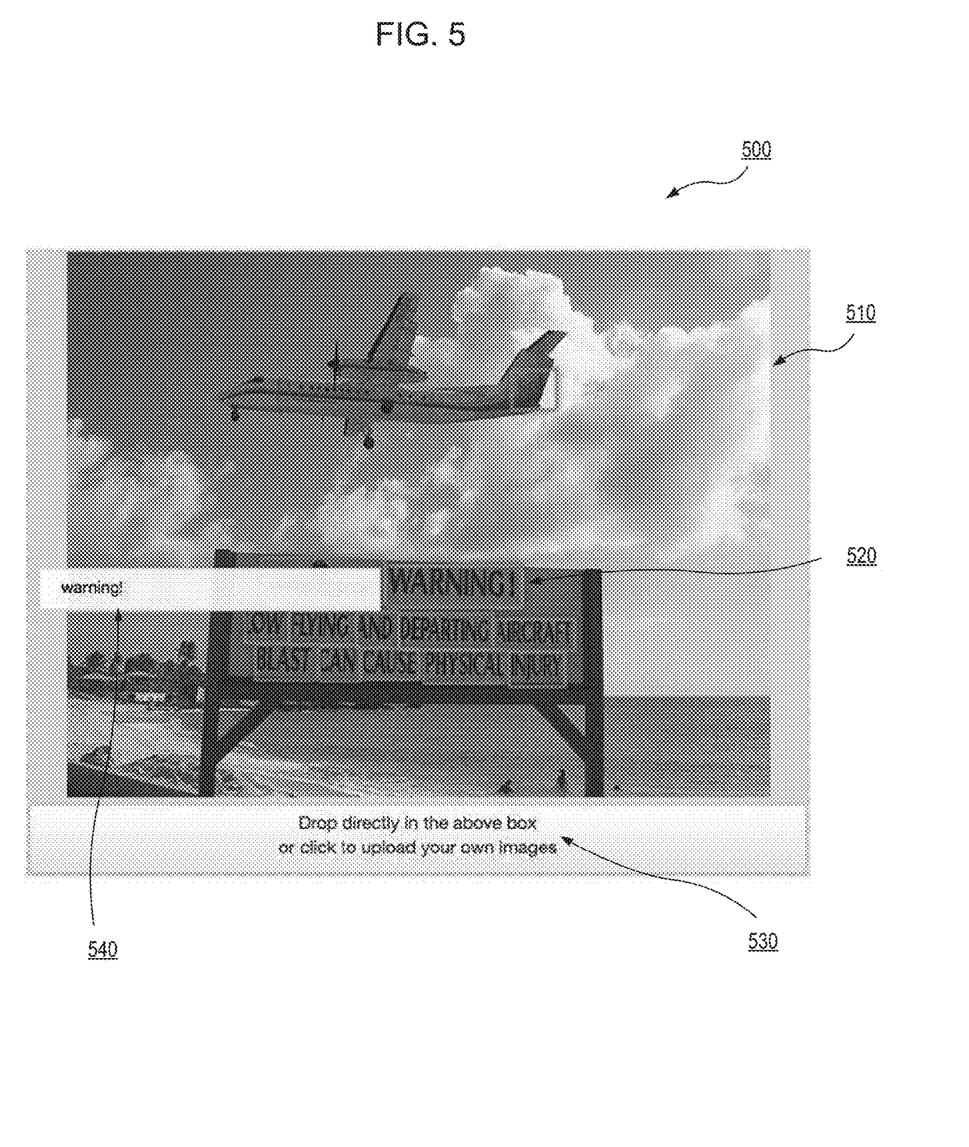
FIG. 5 illustrates an example image processed by an image text recognition system, according to one embodiment.

FIG. 5 illustrates an example interface 500 of an image text recognition system, according to various embodiments. In one embodiment the interface 500 includes a portion wherein a user may submit an image 510 for analysis by the image text recognition system. In this example, instructions 530 are provided to assist a user in the upload or provisioning of the image 510. In one embodiment, the image text recognition system receives the image 510 and performs operations and functions (as described in detail above with respect to FIGS. 1-5) to identify multiple text string prediction regions (e.g., text string prediction region 520. In one embodiment, the image text recognition system generates an output identifying the text string "warning!" 540.

Figure 6:
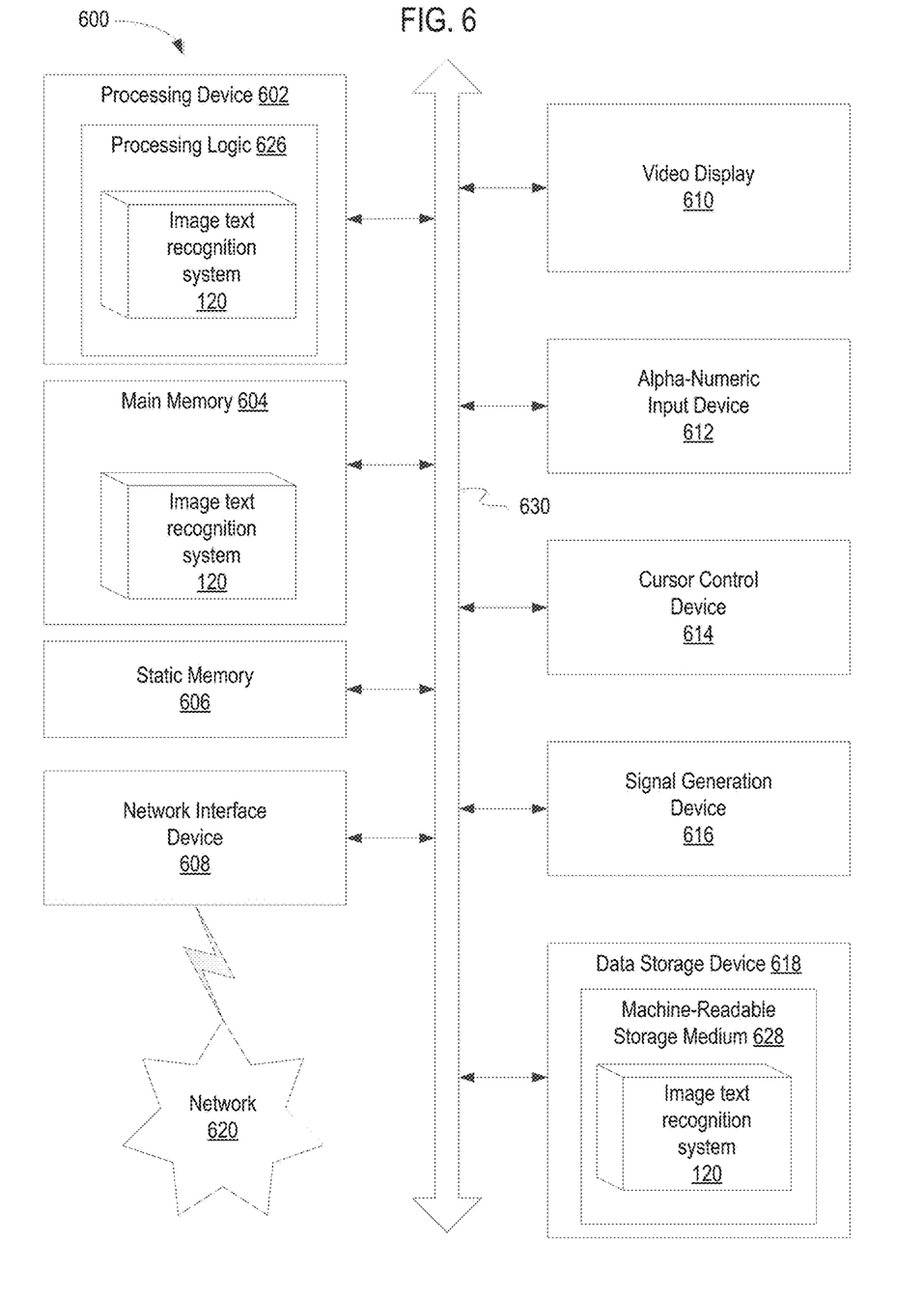
FIG. 6 is a schematic block diagram that provides an example illustration of a computing environment executing instructions relating to an image text recognition system, according to one embodiment.

FIG. 6 illustrates a diagrammatic representation of a machine in the example form of a computer system 600 including a set of instructions executable by an image text recognition system 120 to cause the system to perform any one or more of the methodologies discussed herein. In one embodiment, the neural network may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the image text recognition system 120 for performing the operations and processes described herein.

The computer system 600 may further include a network interface device 608. The computer system 800 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the image text recognition system 120 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying, "generating", "detecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying a first object in an image;
    identifying a first region within the image;
    identifying text characters of one or more words within the first region;
    generating a profile comprising classification information corresponding to the text characters based on a stored association between a position of the text characters within the first region and the first object; and
    storing the profile in a memory.

2. The method of claim 1, further comprising generating first localization information by applying a bounding box regression to the image, wherein the first localization information comprises a set of coordinates defining a bounding box corresponding to a portion of the image comprising a first word of the one or more words.

3. The method of claim 2, further comprising generating first classification information corresponding to the first word of the one or more words.

4. The method of claim 3, further comprising applying a joint loss function to optimize the first localization information and the first classification information.

5. The method of claim 1, wherein the first object represents a source of a first word of the one or more words.

6. The method of claim 1, further comprising generating a plurality of versions of the image having different resolutions, prior to identifying the first region within the image.

7. The method of claim 1, wherein the first region corresponds to a prediction region corresponding to the one or more words, the first region generated by a first neural network trained to identify the one or more words.

8. The method of claim 1, wherein the profile comprises an attribute of the text characters, the attribute comprising at least one of a font type, a font size, a language of the text characters, or an orientation of the text characters.

9. A system comprising:
a processing device; and
a memory to store computer-executable instructions that, if executed, cause the processing device to:
identify an image;
generate a plurality of image versions, wherein each of the plurality of image versions has a different resolution;
generate, based on the plurality of image versions, first bounding box coordinates corresponding to a first region comprising a first word;
identify, within the first region, second bounding box coordinates corresponding to a set of text characters of the first word;
identify, within the image, a first object representing a source of the first word;
determine classification information defining a classification of the first word in view of a stored association between the first object and the first word;
generate a profile comprising the classification information corresponding to the set of text characters; and
store the profile.

10. The system of claim 9, the processing device to optimize a joint loss function corresponding to the first bounding box coordinates and the classification information.

11. The system of claim 9, the processing device to determine a set of attributes corresponding to the image, wherein the set of attributes comprises a font size and a font type corresponding to the set of text characters of the first word.

12. The system of claim 9, wherein the first bounding box coordinates are generated by a first neural network trained to detect one or more words, and wherein the second bounding box coordinates are generated by a second neural network trained to detect the set of text characters.

13. A non-transitory computer-readable storage device storing computer-executable instructions that, if executed by a processing device, cause the processing device to:
receive an image via a network;
identify, by a first neural network, first localization information corresponding to a first region of the image, wherein the first region comprises a first word;
identify, by a second neural network, second localization information corresponding to one or more second regions comprising a set of text characters of the first word;
identify, by a third neural network, a first object within the image;
generate a profile comprising classification information corresponding to the set of text characters based on a stored association between the first object and the first word; and
store the profile.

14. The non-transitory computer-readable storage device of claim 13, the processing device to identify an association between the first object and the first word, wherein the first object corresponds to a source of the first word.

15. The non-transitory computer-readable storage device of claim 13, the first neural network to generate first classification information identifying a first classification of the first word.

16. The non-transitory computer-readable storage device of claim 15, the processing device to apply a joint loss function to optimize the first localization information and the first classification information.

17. The non-transitory computer-readable storage device of claim 13, the processing device to determine a set of attributes corresponding to the image based on an association between the first object and the first word.

18. The non-transitory computer-readable storage device of claim 17, wherein the set of attributes comprises a font size and a font type corresponding to the set of text characters of the first word.

19. The non-transitory computer-readable storage device of claim 13, wherein the first localization information is identified based on a plurality of versions of the image having different resolutions.

* * * * *